(12) United States Patent
Stacey et al.

(10) Patent No.: US 8,976,877 B2
(45) Date of Patent: Mar. 10, 2015

(54) TECHNIQUES FOR MULTI-USER MIMO SOUNDING IN WIRELESS NETWORKS

(75) Inventors: Robert J. Stacey, Portland, OR (US); Michelle X. Gong, Sunnyvale, CA (US); Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 12/890,102

(22) Filed: Sep. 24, 2010

(65) Prior Publication Data

US 2012/0076179 A1    Mar. 29, 2012

(51) Int. Cl.
| | | |
|---|---|---|
| *H04L 27/28* | (2006.01) | |
| *H04W 74/06* | (2009.01) | |
| *H04B 7/04* | (2006.01) | |
| *H04B 7/06* | (2006.01) | |
| *H04L 1/00* | (2006.01) | |
| *H04W 24/00* | (2009.01) | |
| *H04W 88/08* | (2009.01) | |

(52) U.S. Cl.
CPC ............. *H04W 74/06* (2013.01); *H04B 7/0452* (2013.01); *H04B 7/0626* (2013.01); *H04L 1/0027* (2013.01); *H04W 24/00* (2013.01); *H04W 88/08* (2013.01)
USPC ........................................................ 375/260

(58) Field of Classification Search
None
See application file for complete search history.

(56) References Cited

U.S. PATENT DOCUMENTS

| 2008/0002733 A1 | 1/2008 | Sutskover | |
| 2009/0196372 A1 | 8/2009 | Zhang et al. | |
| 2009/0280749 A1* | 11/2009 | Tanno et al. | 455/67.13 |
| 2010/0080173 A1 | 4/2010 | Takagi | |
| 2011/0002219 A1* | 1/2011 | Kim et al. | 370/203 |
| 2011/0128947 A1* | 6/2011 | Liu et al. | 370/338 |
| 2011/0164597 A1* | 7/2011 | Amini et al. | 370/338 |
| 2011/0176472 A1* | 7/2011 | Amini et al. | 370/312 |
| 2011/0222473 A1* | 9/2011 | Breit et al. | 370/328 |
| 2012/0026909 A1* | 2/2012 | Seok | 370/252 |
| 2012/0057471 A1* | 3/2012 | Amini et al. | 370/242 |
| 2012/0106531 A1* | 5/2012 | Seok et al. | 370/338 |
| 2012/0177018 A1* | 7/2012 | Abraham et al. | 370/338 |

FOREIGN PATENT DOCUMENTS

| JP | 2010-538514 A | 12/2010 |
| JP | 2013-513309 A | 4/2013 |
| JP | 2013-535914 A | 9/2013 |

(Continued)

OTHER PUBLICATIONS

International Search Report and Written Opinion Received for PCT Application No. PCT/US2011/053332, mailed on Feb. 17, 2012, 10 pages.

(Continued)

*Primary Examiner* — Khai Tran
(74) *Attorney, Agent, or Firm* — John F. Travis

(57) ABSTRACT

An embodiment of the present invention provides an apparatus, comprising a transceiver operable as an access point and capable of communicating in a wireless network, the AP adapted to perform a down link multi user-multiple input multiple output (DL MU-MIMO) transmission and further adapted to transmit a null data packet (NDP) to sound channels between intended recipient wireless stations (STAs), and wherein following a DL MU-MIMO transmission of the NDP, the AP polls each of the STAs in turn for channel state information.

22 Claims, 1 Drawing Sheet

(56) References Cited

FOREIGN PATENT DOCUMENTS

| WO | 2012/006472 | A2 | 1/2012 |
|---|---|---|---|
| WO | 2012/015737 | A1 | 2/2012 |
| WO | 2012/040739 | A1 | 3/2012 |
| WO | 2009/027931 | A2 | 8/2012 |

OTHER PUBLICATIONS

International Preliminary Report on Patentability received for International Application No. PCT/US2011/053332, mailed on Apr. 4, 2013, 7 pages.

Office Action received for Korean Patent Application No. 10-2013-7004878, mailed on Feb. 26, 2014, 3 Pages of English Translation and 4 Pages of Office Action.

Zhang et al., "11ac Explicit Sounding and Feedback", IEEE Draft, Sep. 14. 2010, 44 Pages.

Extended European Search Report received for Patent Application No. 11827752.4, mailed on Feb. 21, 2014, 11 pages.

Gong et al., "Training protocols for multi-user MIMO wireless LANs", 21st International Symposium on Personal Indoor and Mobile Radio Communications, IEEE, Sep. 26, 2010, pp. 1218-1223.

Mirkovic et al., "Channel Aware Scheduling in MU-DCF WLANs", IEEE, Sep. 21, 2007, pp. 1184-1187.

Supplemental European Search Report received for Patent Application No. 11827752.4, mailed on Mar. 12, 2014, 1 Page.

Office Action received for Japanese Patent Application No. 2013-530405, mailed on Mar. 4, 2014, 2 Pages of English Translation and 3 Pages of Office Action.

Simone Merlin et al., "Protocol for SU and MU Sounding Feedback", IEEE 802. 11-10/1091r0, Sep. 14, 2010, 7 pages.

\* cited by examiner

TECHNIQUES FOR MULTI-USER MIMO SOUNDING IN WIRELESS NETWORKS

BACKGROUND

Wireless communication and wireless networks have become pervasive and vital throughout society. Improvements have been made to these wireless networks. For example, although not limited in this respect, a technique for sounding techniques have been developed for single user-multiple input multiple output SU-MIMO wireless communication techniques. However, there is currently no standardized protocol for multi user-multiple input multiple output (MU-MIMO) sounding in networks, such as, but not limited to, those that conform to the Institute for Electronic and Electrical Engineers (IEEE) 802.11 standard.

Consequently, there is a strong need in the wireless communication industry for techniques for MU-MIMO sounding in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
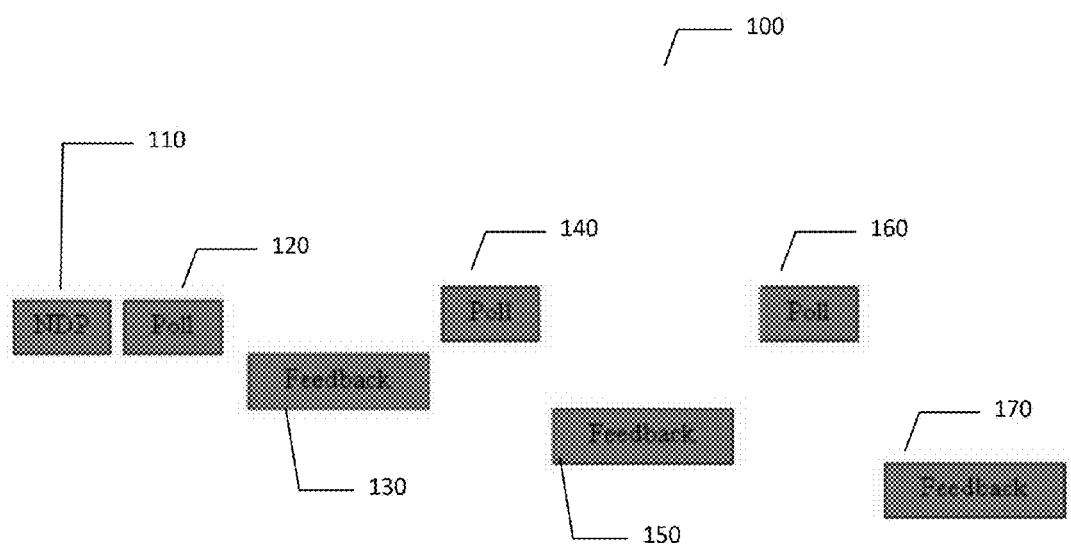
FIG. 1 illustrates a sounding exchange sequence with three STAs according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

In the downstream or downlink case, the generically-named transmitters above may be interchangeably referred to as a base station (BS) or enhanced Node B (eNB) or access point (AP) at the system level herein. In this downlink case, the receivers may be interchangeably referred to as a mobile station (MS) or subscriber station (SS) or user equipment (UE) or station (STA) at the system level herein. Further, the terms BS, eNB, and AP may be conceptually interchanged, depending on which wireless protocol is being used, so a reference to BS herein may also be seen as a reference to either of eNB or AP. Similarly, a reference to MS or SS herein may also be seen as a reference to either of UE or STA.

Embodiments of the present invention provide a protocol or packet exchange sequence for sounding the channel between an AP and multiple STAs and soliciting feedback from the individual STAs. Embodiments of the present invention may build on IEEE 802.11n sounding for single user transmit beamforming (SU TxBF) and provides enhancements sounding to support downlink multi-user MIMO (DL MU-MIMO). For the purposes of the present invention, sounding for DL MU-MIMO differs from sounding for SU TxBF in that: a) the SIG field of the null data packet (NDP—the sounding packet) used for DL MU-MIMO contains different information from the SIG field of NDP used for SU TxBF; and b) with SU TxBF, feedback is obtained from a single user while with DL MU-MIMO, feedback is obtained from multiple users.

Embodiments of the present invention provide distinctions from current IEEE 802.11n sounding, such as the NDP is not preceded by a frame containing an NDP Announcement as it is in 802.11n sounding and embodiments of the present invention may provide a special polling frame is used to solicit feedback from each of the STAs (in current networks that conform to an 802.11n standard, feedback is solicited in the frame carrying the NDP Announcement). Further the present invention may provide that the NDP frame includes a token in the PHY SIG field which is returned in the feedback frame allowing the STA that transmits the NDP to validate that the feedback is associated with the correct NDP (again, in networks that conform to the current IEEE 802.11n standard, a similar token is provided in the frame carrying the NDP Announcement).

Figure 2:
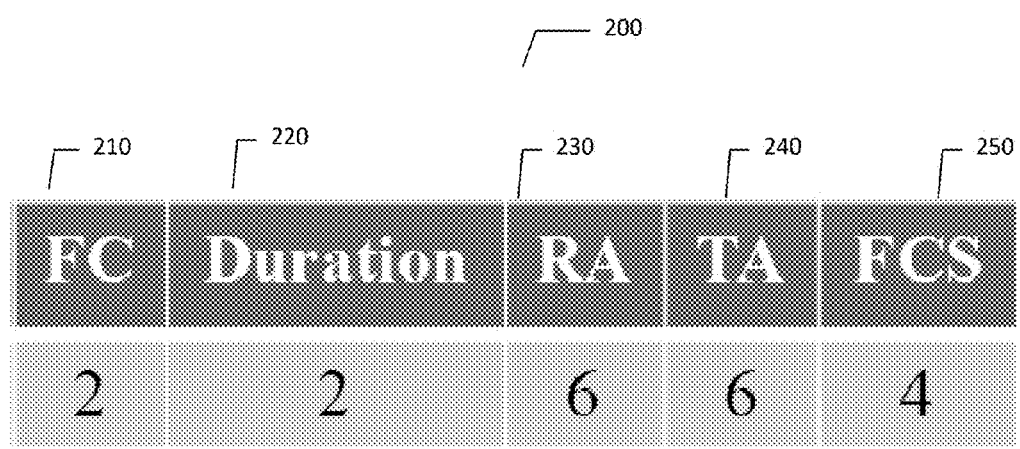
FIG. 2 shows a possible frame format for a Poll frame according to embodiments of the present invention.

Looking now at the figures, FIG. 1, shown generally as 100, provides a sounding exchange sequence with three STAs for DL MU-MIMO sounding. FIG. 2, shown generally as 200, provides a possible frame format for a Poll frame according to embodiments of the present invention.

The sequence proceeds as follows. The AP or STA that will perform the DL MU-MIMO transmissions transmits an NDP 110 to sound the channel between the intended recipient STAs. Following the transmission of the NDP 110, the AP polls each of the STAs 120, 140, 160 in turn for channel state information with feedback 130, 150, 170. FIG. 2 shows a possible frame format for the Poll frame and may include FC 210, Duration 220, RA (receive address) 230, TA (transmit address) 240 and FCS 250.

Important features of the frame may include the following:

a. The frame includes the address of the intended recipient—the STA for which feedback is being solicited—in the RA (receive address) field.

b. The frame includes the address of the STA performing the sounding in the TA (transmit address) field.

c. The frame includes a Duration value that will set the NAV of 3rd party STAs in order to protect the solicited feedback frame from collision by possible transmissions from the STAs.

d. The frame is short and can thus be efficiently transported using a low MCS and thus be received by all STAs in the vicinity of the AP.

On receiving an NDP frame, a STA uses the frame to measure and store channel state information. The STA also stores the token present in the NDP SIG field. On receiving a Poll frame addressed to it, a STA responds with a feedback frame containing the last channel state information stored as well as the associated token from the NDP from which the CSI was collected. If the STA has no stored CSI, the STA will respond with a null feedback frame—a frame that indicates that the STA has no stored feedback.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by a system, by a station, by a processor or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
 a transceiver operable as an access point and capable of communicating in a wireless network, said transceiver adapted to perform a down link multi user-multiple input multiple output (DL MU-MIMO) transmission and further adapted to transmit a null data packet (NDP) to sound channels between intended recipient wireless stations (STAs);
 wherein following a DL MU-MIMO transmission of said NDP, said transceiver is to separately poll each of multiple ones of said STAs for channel state information (CSI) with a polling frame and receive a feedback frame from at least one of said STAs in response to at least one of the polling frames;
 wherein the feedback frame is to include a token to verify that said feedback frame is associated with a correct NDP.

2. The apparatus of claim 1, wherein said polling frame comprises a duration field, receive address field, and a transmit address field.

3. The apparatus of claim 1, wherein a format of said polling frame is to include the address of a STA performing a sounding in the transmit address (TA).

4. The apparatus of claim 1, wherein a format of said polling frame is to include a duration value that will set a NAV of 3rd party STAs in order to protect a solicited feedback frame from collision by possible transmissions from said STAs.

5. The apparatus of claim 1, wherein a format of said polling frame is to include that said frame is short and can thus be efficiently transported using a low MCS and thus be received by all STAs in a vicinity of said AP.

6. A method, comprising:
 operating a transceiver as an access point (AP) and communicating in a wireless network, said transceiver adapted to perform a down link multi user-multiple input multiple output (DL MU-MIMO) transmission, said communicating including:
 transmitting a null data packet (NDP) to sound channels between intended recipient wireless stations (STAs); and
 separately polling each of multiple ones of said STAs for channel state information with a polling frame and receiving a feedback frame from at least one of said STAs in response to at least one of the polling frames;
 wherein the feedback frame is to include a token to verify that said feedback frame is associated with a correct NDP.

7. The method of claim 6, wherein said polling frame comprises a duration field, a receive address field, and a transmit address field.

8. The method of claim 6, wherein a format of said polling frame includes that said polling frame includes an address of an intended recipient in a receive address (RA) field.

9. The method of claim 6, wherein a format of said polling frame includes that said polling frame includes the address of a STA performing a sounding in the transmit address (TA).

10. The method of claim 6, wherein a format of said polling frame includes that said polling frame includes a duration value that will set a NAV of 3rd party STAs in order to protect a solicited feedback frame from collision by possible transmissions from said STAs.

11. The method of claim 6, wherein a format of said polling frame includes that said polling frame includes that said frame is short and can thus be efficiently transported using a low MCS and thus be received by all STAs in a vicinity of said AP.

12. A computer readable non-transitory medium encoded with computer executable instructions, which when accessed, cause a machine to perform operations comprising:

controlling a transceiver as an access point (AP) in a wireless network, said transceiver adapted to perform a down link multi user-multiple input multiple output (DL MU-MIMO) transmission;

transmitting a null data packet (NDP) to sound channels between intended recipient wireless stations (STAs); and separately transmitting a polling frame, subsequent to said transmitting the NDP, to each of multiple ones of said STAs for channel state information and receiving a feedback frame from at least one of said STAs in response to at least one of the polling frames;

wherein the feedback frame is to include a token to verify that said feedback frame is associated with a correct NDP.

13. The computer readable medium encoded with computer executable instructions of claim 12, wherein a format of said polling frame includes an address of an intended recipient in a receive address (RA) field.

14. The computer readable medium encoded with computer executable instructions of claim 12, wherein a format of said polling frame includes the address of a STA performing a sounding in the transmit address (TA).

15. The computer readable medium encoded with computer executable instructions of claim 12, wherein a format of said polling frame includes a duration value that will set a NAV of 3rd party STAs in order to protect a solicited feedback frame from collision by possible transmissions from said STAs.

16. The computer readable medium encoded with computer executable instructions of claim 12, wherein a format of said polling frame includes that said polling frame is short and can thus be efficiently transported using a low MCS and thus be received by all STAs in a vicinity of said AP.

17. An apparatus, comprising:
a transceiver capable of operating as a mobile device in a wireless communications network capable of multiuser-multiple input multiple output (MU-MIMO) communications, the transceiver adapted to:
receive a null data packet (NDP) from an access point (AP) for sounding channels between the transceiver and the access point;
receive, subsequent to said receiving the NDP, a polling frame from the AP; and
transmit channel state information in response to said receiving the polling frame and receive a feedback frame from at least one of said STAs in response to at least one of the polling frames;
wherein the feedback frame is to include a token to verify that said feedback frame is associated with a correct NDP.

18. The apparatus of claim 17, wherein the transceiver is further adapted to:
derive the channel state information from the received NDP; and
include that derived channel state information in the response.

19. A method, comprising:
operating as a mobile device in a wireless communications network capable of multiuser-multiple input multiple output (MU-MIMO) communications;
receiving a null data packet (NDP) from an access point (AP) for sounding channels between the access point and the mobile device;
receiving, subsequent to said receiving the NDP, a polling frame from the AP; and
transmitting channel state information in response to said receiving the polling frame and receiving a feedback frame from at least one of said STAs in response to at least one of the polling frames;
wherein the feedback frame is to include a token to verify that said feedback frame is associated with a correct NDP.

20. The method of claim 19, further comprising:
deriving the channel state information from the received NDP; and
including that derived channel state information in the response.

21. A computer readable non-transitory medium encoded with computer executable instructions, which when accessed, cause a machine to perform operations comprising:
operating as a mobile device in a wireless communications network capable of multiuser-multiple input multiple output (MU-MIMO) communications;
receiving a null data packet (NDP) from an access point (AP) for sounding channels between the access point and the mobile device;
receiving, subsequent to said receiving the NDP, a polling frame from the AP; and
transmitting channel state information in response to said receiving the polling frame and receiving a feedback frame from at least one of said STAs in response to at least one of the polling frames;
wherein the feedback frame is to include a token to verify that said feedback frame is associated with a correct NDP.

22. The medium of claim 21, wherein the operations further comprise:
deriving the channel state information from the received NDP; and
including that derived channel state information in the response.

* * * * *